(12) United States Patent
Chen et al.

(10) Patent No.: US 7,263,191 B2
(45) Date of Patent: Aug. 28, 2007

(54) METHOD AND APPARATUS FOR ENCRYPTING DATA

(75) Inventors: Liqun Chen, Bristol (GB); Keith Alexander Harrison, Woodcroft Chepstow (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 710 days.

(21) Appl. No.: 10/270,040

(22) Filed: Oct. 11, 2002

(65) Prior Publication Data

US 2003/0091192 A1 May 15, 2003

(30) Foreign Application Priority Data

Oct. 15, 2001 (GB) .................................. 0124686.7

(51) Int. Cl.
*H04L 9/00* (2006.01)

(52) U.S. Cl. .................................................... 380/265

(58) Field of Classification Search ................ 380/265, 380/278, 44
See application file for complete search history.

(56) References Cited

U.S. PATENT DOCUMENTS

| | | | | |
|---|---|---|---|---|
| 4,322,577 A | * | 3/1982 | Brandstrom | 380/37 |
| 4,514,592 A | * | 4/1985 | Miyaguchi | 380/30 |
| 5,199,070 A | * | 3/1993 | Matsuzaki et al. | 380/30 |
| 6,064,740 A | * | 5/2000 | Curiger et al. | 380/265 |
| 6,182,216 B1 | * | 1/2001 | Luyster | 713/168 |
| 6,192,129 B1 | * | 2/2001 | Coppersmith et al. | 380/259 |
| 6,389,534 B1 | | 5/2002 | Elgamal et al. | 713/164 |
| 6,560,338 B1 | * | 5/2003 | Rose et al. | 380/47 |
| 6,578,061 B1 | * | 6/2003 | Aoki et al. | 708/520 |
| 6,782,039 B2 | * | 8/2004 | Alamouti et al. | 375/147 |
| 6,853,988 B1 | | 2/2005 | Dickinson et al. | 705/75 |
| 6,888,941 B2 | * | 5/2005 | Rose | 380/46 |
| 6,895,507 B1 | | 5/2005 | Teppler | 726/19 |
| 6,925,563 B1 | * | 8/2005 | Jennings | 713/174 |
| 6,937,731 B2 | | 8/2005 | Chiu | 380/270 |
| 6,963,976 B1 | * | 11/2005 | Jutla | 713/181 |
| 7,096,204 B1 | | 8/2006 | Chen et al. | 705/74 |
| 2002/0010772 A1 | | 1/2002 | Kusano | 709/223 |
| 2002/0032312 A1 | | 3/2002 | Deo et al. | 530/387.3 |

(Continued)

FOREIGN PATENT DOCUMENTS

EP 0 354 774 A2 2/1990

(Continued)

OTHER PUBLICATIONS

Cocks, C., "An Identity Based Encryption Scheme based on Quadratic Residues," Communications—Electronics Security Group, PO Box 144, Cheltenham GL52 5UE (4 pages).

(Continued)

*Primary Examiner*—Kambiz Zand
*Assistant Examiner*—Aubrey H Wyszynski

(57) ABSTRACT

A method for encrypting data comprising dividing a first data set into a second data set and a third data set; deriving a first value using the second data set as an input into a polynomial equation; deriving a second value using the third data set as an input into the polynomial equation; deriving a first encryption key associated with a first party; deriving a second encryption key associated with a second party; encrypting the first value with the first encryption key; encrypting the second value with the second encryption key.

9 Claims, 1 Drawing Sheet

U.S. PATENT DOCUMENTS

| | | |
|---|---|---|
| 2002/0172367 A1 | 11/2002 | Mulder et al. ............... 380/277 |
| 2003/0051129 A1 | 3/2003 | Razdan et al. ............... 713/151 |
| 2004/0030652 A1 | 2/2004 | Grunzig et al. ............... 705/51 |

FOREIGN PATENT DOCUMENTS

| | | |
|---|---|---|
| EP | 0 723 348 A2 | 7/1996 |
| EP | 0 851 629 A2 | 7/1998 |
| EP | 1 043 862 A2 | 10/2000 |
| JP | 2001-244924 | 9/2000 |
| WO | 96/05674 A1 | 2/1996 |
| WO | 01-06697 A2 | 1/2001 |
| WO | 01/11527 A2 | 2/2001 |

OTHER PUBLICATIONS

Boneh, D., et al., "Identity-Based Encryption from the Weil Pairing," (pp. 1-30).

Shamir, A., "How to Share a Secret", *Nick Szabo's Papers and Concise Tutorials*, http://szabo.best.vwh.net/secret.html (retrieved Jun. 25, 2006).

Boneh, D., et al., "Identity-Based Encryption from the Weil Pairing", *Proceedings of Crypto' 2001*.

Krawczyk, H., "Secret Sharing Made Short", pp. 136-146, Springer Verlag (1998).

Menezes, A., et al., "Handbook of Applied Cryptography", Ch. 12, pp. 524-528 (1997).

\* cited by examiner

METHOD AND APPARATUS FOR ENCRYPTING DATA

TECHNICAL FIELD

The present invention relates to a method and apparatus for encrypting data.

BACKGROUND ART

With the increasing use of electronic communications the use of encryption technology has become commonplace, with a trust authority being responsible for issuing decryption keys, thereby allowing the secure exchange of electronic data.

However, some users of encryption systems have concerns that using a single trust authority to provide a decryption key creates a point of compromise or system failure.

To overcome this problem multiple trust authority encryption systems have been proposed where typically two or more trust authorities act as cooperating parties, where a shared secret is held by all cooperating trust authorities. To ensure that no single trust authority can be a point of compromise or system failure none of the cooperating parties have sufficient information to be able to derive the shared secret independently.

However, this solution requires that all of the relevant trust authorities have to be involved in running such a secret sharing scheme and it may be difficult to organise the relevant trust authorities to run such a secret sharing protocol, since, for various reasons, some of them may not be interested in co-operating with the other trust authorities.

It is desirable to improve this situation.

SUMMARY OF THE INVENTION

In accordance with a first aspect of the present invention there is provided a A method for encrypting data comprising dividing a first data set into a second data set and a third data set; deriving a first value using the second data set as an input into a polynomial equation; deriving a second value using the third data set as an input into the polynomial equation; deriving a first encryption key associated with a first party; deriving a second encryption key associated with a second party; encrypting the first value with the first encryption key; encrypting the second value with the second encryption key.

Preferably the method further comprising providing the first and second encrypted values to a third party for decryption and recovery of the first data set.

Preferably the first and second parties are a first and second trust authority respectively.

Preferably the size of the second and third data set is the same.

Preferably the elements of the second and third data set are random and independent.

Preferably the first and second encryption keys are identifier based encryption keys.

In accordance with a second aspect of the present invention there is provided a method for encrypting data comprising dividing a first data set into a second data set and a third data set; deriving a first value using the second data set as an input into a polynomial equation; deriving a second value using the third data set as an input into the polynomial equation; deriving a first encryption key associated with a first party; deriving a second encryption key associated with a second party; encrypting the first value with the first encryption key; encrypting the second value with the second encryption key; providing the encrypted first and second value to a recipient; providing the first encryption key to the first party such that on satisfaction of a condition the first party provides an associated first decryption key to the recipient; providing the second public key to the second party such that on satisfaction of a condition the second party provides an associated second decryption key to the recipient; decrypting and recovery of the first data set by the recipient using the first and second decryption key.

In accordance with a third aspect of the present invention there is provided a computer apparatus for encrypting data comprising a processor arranged to divide a first data set into a second data set and a third data set and deriving a first value using the second data set as an input into a polynomial equation and deriving a second value using the third data set as an input into the polynomial equation and encrypting the first value with the first encryption key and encrypting the second value with the second encryption key.

Preferably the apparatus further comprises communication means for providing the first and second encrypted values to a third party for decryption and recovery of the first data set.

BRIEF DESCRIPTION OF THE DRAWINGS

For a better understanding of the present invention and to understand how the same may be brought into effect reference will now be made, by way of example only, to the accompanying drawings, in which.

DETAILED DESCRIPTION OF PREFERRED EMBODIMENTS OF THE PRESENT INVENTION

Figure 1:
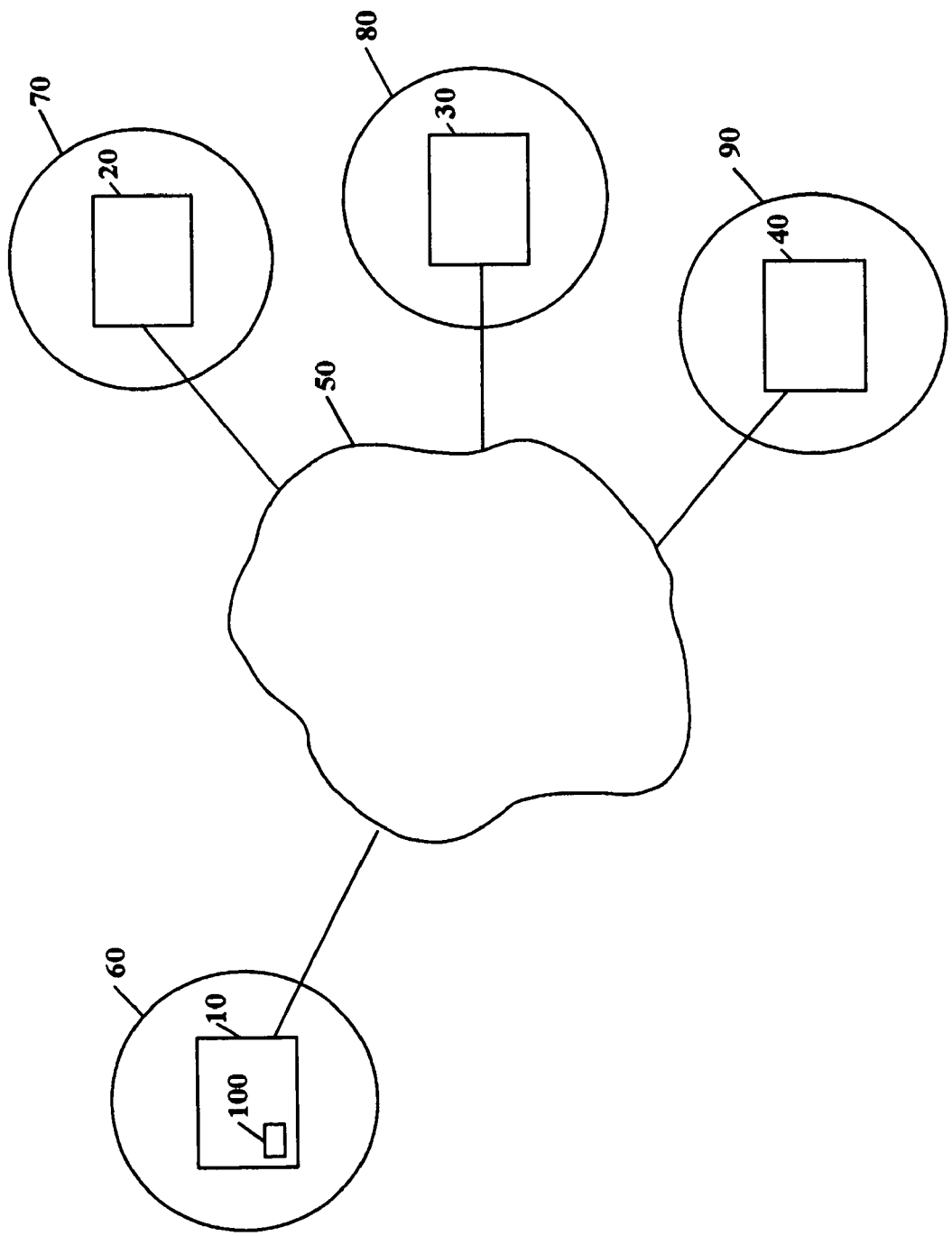
FIG. 1 illustrates a computer system according to a first embodiment of the present invention.

The present embodiment describes a system where a sender of a message uses a plurality of encryption keys, each associated with a respective trust authority, to encrypt sections of the message to be sent. In addition the user uses a threshold scheme to divide the message into separate sections. The use of the threshold scheme described below ensures that any party that has less than a predetermined number of sections cannot recover the message, therefore preventing any individual trust authority, which provides a decryption key for a section of the message, from recovering the message without the permission of the sender.

FIG. 1 shows a first computer entity 10, a second computer entity 20, a third computer entity 30, and a fourth computer entity 40 connected via a network 50, for example the Internet.

The first computer entity 10 represents a user 60, the second computer entity 20 represents the recipient 70 of the message, the third computer entity 30 represents a first trust authority 80 and the fourth computer entity 40 represents a second trust authority 90. In practice, however, a system may include more than two trust authorities.

The first, second, third and fourth computer entities 10, 20, 30, 40 are conventional computing devices as are well known to a person skilled in the art.

The first computer entity 10 includes a processor 100 that is arranged to implement a threshold scheme, as describe below, to divide a message into sections (i.e. shares of the message) prior to encryption and transmission to the second computer entity 20.

The (t, n) threshold scheme (t≤n) method described below allows the user 60 (i.e. the processor) to compute secret shares $S_i$, $1 \leq i \leq n$ from an initial secret S (e.g. a message to be securely transmitted to another user), and securely distributes the shares $S_i$ to the recipient 70, such that the following is true: anyone with t or more shares may easily recover S, but anyone knowing only t−1 or fewer shares may not, where n is the number of shares.

The threshold scheme is based on polynomial interpolation, and the fact that a polynomial y=f(x) of degree t−1 is uniquely defined by t points $(x_i, y_i)$ with distinct $x_i$. The scheme works as follows. The user 60 distributes the shares of the secret to the recipient 70 where the recipient 70 is able to pool the shares to recover the secret S, however anyone who has less than t shares is unable to recover the secret.

To compute the individual shares the user 60, i.e. the processor 100, divides a secret (i.e. message) $S \geq 0$ into a sequence with t elements $\{S_0, S_1, \ldots, S_{t-1}\}$ where each element has the same size |S|/t and each element is ideally random and independent. The user 60 chooses a prime p>max($S_0, S_1, \ldots, S_{t-1}$, n), defining the polynomial over $\mathbb{Z}_p$, $$f(x) = \sum_{j=0}^{t-1} S_j x^j.$$

The user 60 computes shares $s_i=f(x_i)$ mod p, $1 \leq i \leq n$ (or for any n distinct points, $x_i$, $1 \leq x_i \leq p-1$), thereby computing a value of each share such that the secret S is a sequence of coefficients $\{S_0, S_1, \ldots, S_{t-1}\}$ within a polynomial where each coefficient is |S|/t the size of the secret rather than the secret being represented by a single coefficient within the polynomial, as in existing secret sharing schemes.

As stated above, it is desirable that each element of the secret is random and independent. To ensure the elements are random and independent the processor 100 can be arranged to compute another sequence, once the user 60 has divided the secret $S \geq 0$ into a sequence with t elements $\{S_0, S_1, \ldots, S_{t-1}\}$ where each element has the same size |S|/t as described above, with t elements $\{a_0, a_1, \ldots, a_{t-1}\}$, where $a_0=S_0$, $a_1=H(a_0) \oplus S_1 \ldots$, $a_{t-1}=H(a_{t-2}) \oplus S_{t-1}$. H( ) is a hash function where each value of the function is of the same size |S|/t.

The user 60 chooses a prime p>max($a_0, a_1, \ldots, a_{t-1}$, n), defining the polynomial over $\mathbb{Z}_p$, $$f(x) = \sum_{j=0}^{t-1} a_j x^j.$$

The user 60 then computes $s_i=f(x_i)$ mod p, $1 \leq i \leq n$ (or for any n distinct points, $x_i$, $1 \leq x_i \leq p-1$).

Once the shares of the secret have been computed the processor 100 is arranged to encrypt each share with an encryption key associated with a respective trust authority 80, 90, where a different trust authority and encryption key is used for each share.

Any suitable form of encryption may be used and different types of encryption can be used for different shares, however, for the purposes of this embodiment identifier based encryption will be described and in particular quadrature residue (QR) encryption.

The first trust authority 80 and second trust authority 90 each have their own unique public data. The public data for the first trust authority includes a first hash function #1 and a first value N1 that is a product of two random prime numbers p1 and q1, where the values of p1 and q1 are only known to the first trust authority 80. The public data for the second trust authority 90 includes a second hash function #2 and a second value N2 that is a product of two random prime numbers p2 and q2, where the values of p2 and q2 are only known to the second trust authority 90. As such, even though each trust authority has a hash function # and a value N the actual values for each trust authority will be different.

The hash functions #1, #2 have the function of taking a string and returning a value in the range 0 to N−1. Additionally, the hash functions #1, #2 should have the jacobi characteristics: jacobi (#, N)=1. That is to say, where $x^2 \equiv$ #mod N the jacobi (#, N)=−1 if x does not exist, and=1 if x does exist.

The values of p1, p2, q1 and q2 should ideally be in the range of $2^{511}$ and $2^{512}$ and should satisfy the equations: p1,q1$\equiv$3 mod 4, p2,q2$\equiv$3 mod 4. However, p1 and q1 must not have the same value nor p2 and q2.

For the purposes of this embodiment the message to be communicated to the recipient 70 is divided into two sections, where the first share is encrypted with an encryption key associated with the first trust authority 80 and the second share is encrypted with an encryption key associated with the second trust authority 90, as described below.

For each share of the message the user 60 encrypts each bit M of the share using the respective trust authorities hash function # and value N, as described below.

For the purposes of this embodiment public data associated with two trust authorities are being used to create two independent encryption keys to encrypt two sections (i.e. shares) of a message. However, the number of shares selected does not have to correspond to the number of trust authorities used to generate encryption keys.

To encrypt each message section using the respective trust authorities public data the user 60 generates random numbers $t_+$ (where $t_+$ is an integer in the range [0, $2^N$)) until the user 60 finds a value of $t_+$ that satisfies the equation jacobi($t_+$,N)=M, where M represents the individual binary digits 0, 1 of the user's data as—1, 1 respectively. The user 60 then computes the value:

$$s_+ = (t_+ + \#(\text{publickeystring})/t_+) \bmod N.$$

for each bit M where $s_+$ corresponds to the encrypted bit of M.

The publickeystring can be any suitable string that acts as the public key for the recipient 70, for example the publickeystring may correspond to the name or email address of the recipient 70.

In case #(publickeystring) is non-square the user 60 additionally generates additional random numbers $t_-$ (integers in the range [0, $2^N$)) until the user 60 finds one that satisfies the equation jacobi($t_-$,N)=m. The user 60 then computes the value:

$$s_- = (t_- - \#(\text{publickeystring})/t_-) \bmod N$$

for each value of bit M.

The user 60 performs this encryption process for each share using the respective trust authorities public data. The first share is encrypted using the above equation using the first trust authorities public data #1 and N1 and the second section is encrypted using the second trust authorities public data #2 and N2, where the publickeystring could be the same, or different, for each trust authority.

The encrypted shares $s_i$ and publickeystring (i.e. the recipient's public key) with public index $x_i$ are made available to the recipient by any suitable means, for example via e-mail.

To allow the recipient 70 to decrypt the encrypted shares the recipient 70 obtains from the respective trust authorities 80, 90 the recipient's decryption key (i.e. private key) associated with the recipient's encryption key (i.e. public key) used to encrypt the shares.

Each trust authority 80, 90 determines the associated decryption key (i.e. private key) B by solving the equation using the relevant publickeystring and N for the respective trust authority:

$B^2 \equiv \#(\text{publickeystring}) \bmod N$

If a value of B does not exist, then there is a value of B that is satisfied by the equation:

$B^2 \equiv -\#(\text{publickeystring}) \bmod N$

As N is a product of two prime numbers p, q it would be extremely difficult for any one to calculate the private key B with only knowledge of the public key string and N. However, as the trust authority 80, 90 has knowledge of p and q (i.e. two prime numbers) it is relatively straightforward for the trust authority 80, 90 to calculate B.

Typically, the trust authorities 80, 90 will provide the respective decryption key to the recipient 70 on satisfaction of some condition, for example if the publickeystring is an email address the condition may be that the recipient 70 is the owner of the email address.

If the square root of the encryption key returns a positive value, the user's data M can be recovered using:

$M = \text{jacobi}(s_+ + 2B, N)$.

If the square root of the encryption key returns a negative value, the user's data M can be recovered using:

$M = \text{jacobi}(s_- + 2B, N)$.

The recipient 70 uses the appropriate equation above, in conjunction with the private key, to decrypt the message.

As the recipient 70 now has the two unencrypted shares (i.e. t shares) the recipient is able to compute S (i.e. the message). Their shares provide t=2 distinct points $(x, y)=(x_i, s_i)$ (i=1,2) allowing computation of the secret $S=\{S_0, S_1\}$ and $S_j=a_j$, where $a_j$ are coefficients $0 \leq j \leq t$ of f(x). The coefficients of an unknown polynomial f(x) of degree at most t, defined by points $(x_i, y_i)$, $1 \leq i \leq t$, are given by the following formula.

If the polynomial is written in the form $$f(x) = \sum_{j=0}^{t-1} a_j x^j$$

With undetermined coefficients $a_0, a_1, \ldots, a_{t-1}$, and with the condition that it passed through the points $(x_0, y_0)$, $(x_1, y_1)$, ..., $(x_{t-1}, y_{t-1})$, then the adjacent equations must be satisfied. These are t equations for the determination of $a_0$, $a_1, \ldots, a_{t-1}$. They have a unique solution if the basic points $x_0, x_1, \ldots, x_{t-1}$ are all distinct.

If t equations $$a_0 + a_1 x_0 + a_2 x_0^2 + \Lambda + a_{t-1} x_0^{t-1} = y_0$$

$$a_0 + a_1 x_1 + a_2 x_1^2 + \Lambda + a_{t-1} x_1^{t-1} = y_1$$

$$M$$

$$a_0 + a_1 x_{t-1} + a_2 x_{t-1}^2 + \Lambda + a_{t-1} x_{t-1}^{t-1} = y_{t-1}$$

have a non-singular coefficient matrix (note that this is a special Vandermonde's determinant (alternant))

$$A = \begin{vmatrix} 1 & 1 & \Lambda & 1 \\ x_1 & x_2 & \Lambda & x_t \\ x_1^2 & x_2^2 & \Lambda & x_t^2 \\ M & M & M & M \\ x_1^{t-1} & x_2^{t-1} & \Lambda & x_t^{t-1} \end{vmatrix} = \prod_{1 \leq i < j \leq t} (x_j - x_i)$$

so that $|A| \neq 0$, then there is a unique solution $$a_j = \frac{(C_{0j} y_0 + C_{1j} y_1 + \Lambda + C_{(t-1)j} y_{t-1})}{|A|} = \frac{(C_{0j} y_0 + C_{1j} y_1 + \Lambda + C_{(t-1)j} y_{t-1})}{\prod_{1 \leq i < j \leq t} (x_j - x_i)}$$

for j=0, 1, ..., t−1, where $C_{ij}$ is the cofactor of element $a_{ij}$ in the coefficient matrix A (Cramer's rule).

The order of a determinant is the number of elements in its leading diagonal (the diagonal from top left to bottom right), so an t'th-order determinant is associated with an t×t matrix. The minor $A_{ij}$ associated with the element $a_{ij}$ is the (t−1)th-order determinant derived from $[a_{ij}]$ by deletion of its i'th row and j'th column. The cofactor $C_{ij}$ associated with the element $a_{ij}$ is defined as $C_{ij}=(-1)^{i+j} A_{ij}$.

If a large number of basic points are taken into account, the final determination of the interpolation polynomial requires a large amount of calculation, as such it may be preferable to use a small number of shares if limited computation is available.

Accordingly, the recipient 70 is able to recover the message with the knowledge that the individual trust authorities 80, 90 would not be able to recover any part of the message with only knowledge of one message section.

What is claimed:

1. A method for encrypting first data such that the participation of t out of n trusted authorities is required to decrypt the encrypted first data, the method comprising executing instructions on a computer apparatus for:
dividing the first data into t elements where t>1;
setting the value of each coefficient of a polynomial in x of order (t−1) in dependence on a respective one of said elements;
deriving n share values by evaluating said polynomial for n different values of x where n≥t;
encrypting each share value using as encryption parameters both public data of a respective trust authority and a key string that serves, in relation to that trust authority, as a public key of an intended recipients;

providing the encrypted shares, and the values of x used in deriving the shares, to said intended recipient;

providing to the intended recipient, from each of t said trust authorities, a private key corresponding to the said public key of the intended recipient in respect of that trust authority;

using the private keys to decrypt t encrypted shares;

using the decrypted shares to recover the coefficients of said polynomial; and combining the polynomial coefficients to recover the first data.

2. A method according to claim 1, further comprising providing the encrypted shares to said intended recipient for decryption and recovery of the first data.

3. A method according to claim 1, wherein the size of the elements is the same.

4. A method according to claim 1, wherein the elements have values that are random and independent.

5. A method according to claim 1, wherein the public keys of the intended recipient specify conditions to be checked by the trust authorities, a said trust authority only providing the intended recipient with a said private key after checking that the condition specified in the corresponding public key has been met.

6. A method according to claim 1, wherein for 0<j<t, the $j^{th}$ order coefficient of the polynomial, is formed by combining a respective one of said elements with a hash of the $(j-1)^{th}$ order coefficient.

7. Computer apparatus for encrypting first data such that the participation of t out of n trusted authorities is required to decrypt the encrypted first data, the apparatus comprising:

a processor arranged to divide the first data into t elements where t>1, set the value of each coefficient of a polynomial in x of order (t−1) in dependence on a respective one of said elements, derive n share values by evaluating said polynomial for n different values of x where n≧t, and encrypt each share value using as encryption parameters both public data of a respective trust authority and a key string that serves, in relation to that trust authority, as a public key of an intended recipient; and communication means for providing the encrypted shares to a third parry for decryption and recovery of the first data.

8. Apparatus according to claim 7, wherein the size of the elements is the same.

9. Apparatus according to claim 7, wherein the elements have values that are random and independent.

* * * * *